May 17, 1938.  G. WALTHER  2,117,927
METAL WHEEL
Filed Aug. 13, 1934
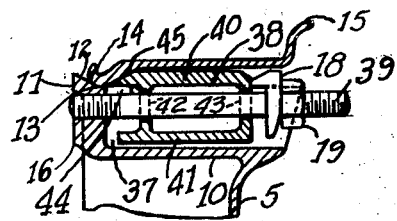
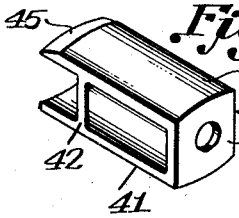
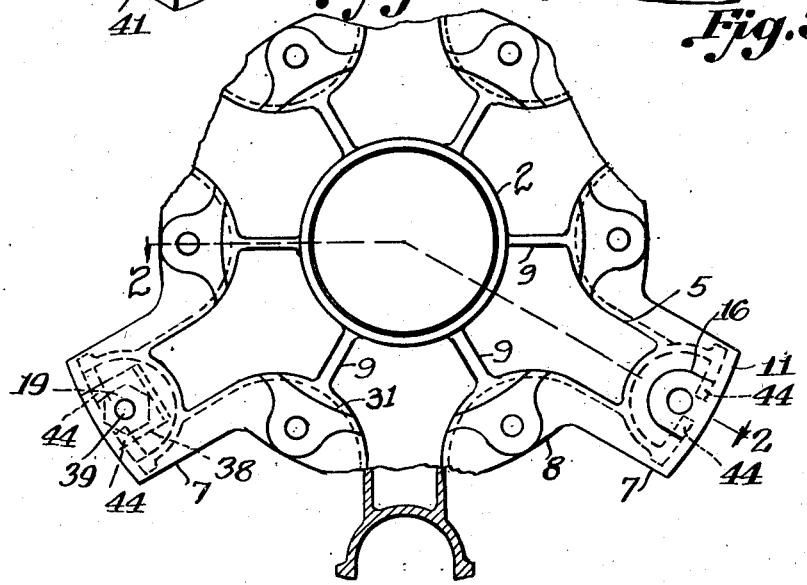
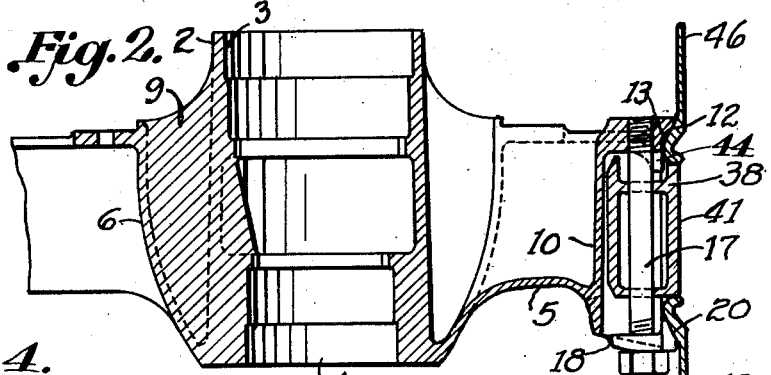
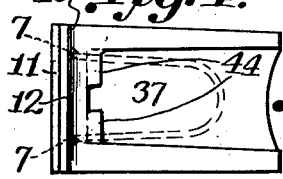
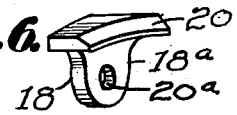
INVENTOR,
George Walther,
BY
Howard A. Smith,
ATTORNEY Patented May 17, 1938

2,117,927

UNITED STATES PATENT OFFICE 2,117,927

METAL WHEEL

George Walther, near Dayton, Ohio, assignor to The Dayton Steel Foundry Company, Dayton, Ohio, a corporation of Ohio Application August 13, 1934, Serial No. 739,561

2 Claims. (Cl. 301—12)

This invention relates to new and useful improvements in metal wheels.

It is one of the principal objects of my invention to provide for both dual and single tire use, a metal wheel that is adapted, when carrying a single tire, to have the track or center line of the tire practically coincide with the center line of the dual mounting. Thus the forces acting on the steering mechanism, which are controlled by the position of the tire on the ground, are not materially affected by the change-over from the dual to the single mounting, or vice versa. In other words, when my mounting is employed, the alinement of the track of the single tire will so nearly coincide with the center line of the track of the dual tire mounting that the steering knuckles will not be subjected to undue strains.

A further object of this invention is to provide a turn-over structure for supporting the single or dual tire assembly on the spoke ends.

In the accompanying drawing illustrating one form of embodiment of my invention, Figure 1 is a side view of the wheel, showing the recesses for harboring the turn-over clamps. Figure 2 is a sectional view taken on the line 2—2 of Figure 1, showing the clamp turned over and supporting dual rims. Figure 3 is a sectional view taken through one of the spoke ends, showing therein a deep recess harboring a turn-over clamp which in this instance is supporting a single rim. Figure 4 is an end view of one of the recessed spoke ends that harbors a turn-over clamp. Figure 5 is a perspective view of one of the turn-over clamp members. And Figure 6 is a perspective view of the rim clamp used with dual tires.

Referring to the accompanying drawing for a detailed description of my invention, the numeral 1 designates a cast metal spoke wheel formed with an elongated hub 2. This hub 2 is machined to receive in its inner and outer ends 3 and 4 respectively, suitable bearings by means of which it is mounted upon an axle not shown.

Equally spaced about the hub 2 are spokes 5 whose inner ends converge with a circular skirt 6, enclosing the hub 2 and tapering to the outer end of the latter with which it is integral. This skirt 6 serves to effectively reinforce the inner ends of the spokes against cooling strains and mechanical stresses, and to form a more pleasing hub contour without sharp pockets between adjacent spokes.

Each spoke 5, which is essentially U shaped in cross section, has formed on each side thereof flanges 7, 7 that join the spoke proper in rounded corners to eliminate the cooling strains that frequently produce hot cracks in the cast metal.

The flanges 7, 7 of adjacent spokes are joined by deep flanges 8 that are integral with the skirt 6 at its periphery. Also extending radially between the hub 2 and skirt 6 are short ribs 9 positioned between the spokes 5 to further reinforce the spoke structure.

At its outer end each spoke is closed to form a segmental end portion 10 having at its inboard edge a raised flange 11. (See Figure 2.) This flange, on its outboard face, is beveled inwardly to form a seat 12 for the inboard rim when used with dual tires. At the junction of this tapered seat 12 and the face of the segmental end 10 of each spoke I have provided an arcuate recess 13 whose inner side is tangent with the surface of the said spoke end. It is the purpose of this recess 13 to receive the gutter portion 14 of a rim 15 when a single tire is applied to my cast wheel shown in Figure 3.

On the outboard face of the wheel there is cast integral with the closed face of each spoke 5, at the radially outer end thereof, a threaded boss 16 in which a threaded stud or bolt 17 is secured. Upon the projecting end of each stud 17 a short wedge clamp 18 is secured by a nut 19. Each clamp 18 is formed with a side portion 18ª and a horizontal portion which projects axially inward from the radially outer edge thereof. Formed at the axially inner edge of the overhanging part of the horizontal portion of the clamp is a tapered seat 20 for an outboard tire rim. Near its horizontal portion the side portion 18ª of the clamp is formed with an aperture 20ª through which a stud 17 is adapted to be forced.

The radially inner part of the side portion of the clamp tapers inwardly. The nut 19 on each stud engages the clamp directly in the line of its tapered seat 20 to prevent the clamp from tipping, which is common in those clamps in which the apertured part of the clamp acts as a fulcrum, permitting the clamp to tip when nut pressure is exerted against it.

In Figure 3 I have illustrated a turn-over structure for supporting a single tire assembly on the ends of the spokes. In this figure there is formed in the spoke end a deep recess 37 in which a turn-over support 38 is mounted on a through bolt 17. Each turn-over support comprises two parallel members 40 and 41 joined by diametric ribs 42 and 43 that pivot on the bolt. At their inboard ends the members 40 and 41 straddle a ledge 44 below the seat 12 on the spoke end.

At its inboard end the member 40 is formed with a tapered seat 45 for the gutter portion of the tire rim 15, and when supporting the latter, the seat portion 45 of said member rests on the seats 44. There are two of these seats 44 on each spoke end, being ledges which project axially outward from the seat 12.

When the spoke end supports a dual tire mounting, the clamp 18 and nut 19 are removed from the bolt and the support 38 turned over to permit the mounting of an inboard tire rim 46 on the seat 12, after which it is further turned to a position to cause its member 41 to act as a spacer between that rim and an outboard rim 47 mounted on the clamps 18.

By this alternate method of single and dual tire mountings, the alinement of the track of the single tire will so nearly coincide with the center line of the track of a dual tire mounting, that undue strains are not produced on the steering knuckles, and the forces acting on the steering mechanism are unaffected by the alternate uses of single and dual tires. This alinement feature is of particular merit in front axle installations of trucks employed on soft road surfaces.

Having described my invention, I claim:

1. A metal wheel including a hub and spokes, each spoke formed at its inboard end portion with a tapered seat for an overhanging tire rim of a dual tire assembly, a turn-over support mounted in each spoke end, formed on one side with a beveled inboard seat, and a single tire rim having a gutter portion adapted to be supported on the last named seat, said turn-over supports adapted to be turned to a position to provide spacers between the dual tire rims when they are mounted on the spoke ends.

2. A metal wheel including a hub and spokes, each spoke formed at its inboard end portion with a tapered seat for an overhanging rim of a dual tire assembly, each spoke end also formed with a recess adjacent said seat, a through-bolt mounted in the recessed end of each spoke, a turn-over clamp mounted on said bolt, said clamp comprising two joined, parallel axial portions, one axial portion of the clamp formed on one side with a beveled inboard seat, and a single tire rim having a gutter portion adapted to be supported on the last-named seat, said turn-over clamps adapted to be rotated to positions on their respective bolts to bring their other axial portions between the dual tire rims to act as spacers between said rims when they are mounted on the spoke ends.

GEORGE WALTHER.